(12) United States Patent
Hanley et al.

(10) Patent No.: US 10,612,576 B2
(45) Date of Patent: Apr. 7, 2020

(54) CURTAIN ROD BRACKET AND CAM LOCK

(71) Applicant: Kenney Manufacturing Company, Warwick, RI (US)

(72) Inventors: Michael P. Hanley, Smithfield, RI (US); Sally Voas, Albion, RI (US); Jeffrey Klowan, Woonsocket, RI (US)

(73) Assignee: Kenney Manufacturing Company, Warwick, RI (US)

( * ) Notice: Subject to any disclaimer, the term of this patent is extended or adjusted under 35 U.S.C. 154(b) by 0 days.

(21) Appl. No.: 16/126,977

(22) Filed: Sep. 10, 2018

(65) Prior Publication Data
US 2019/0099034 A1 Apr. 4, 2019

Related U.S. Application Data

(63) Continuation of application No. 15/668,167, filed on Aug. 3, 2017, now Pat. No. 10,070,748.
(Continued)

(51) Int. Cl.
*F16B 7/14* (2006.01)
*A47H 1/022* (2006.01)

(52) U.S. Cl.
CPC ........... *F16B 7/1427* (2013.01); *A47H 1/022* (2013.01); *Y10T 403/32501* (2015.01)

(58) Field of Classification Search
CPC .. A47H 1/02; A47H 1/022; A47H 2001/0215; A47K 3/38; F16B 2/18; F16B 7/0413; F16B 7/14; F16B 7/1418; F16B 7/1427; F16B 7/1463; F16B 7/18; F16B 7/182; F16B 7/187; Y10T 403/32467; Y10T 403/32491; Y10T 403/32501; Y10T 403/32524; Y10T 403/556; Y10T 403/5793; Y10T 403/589; Y10T 403/68; Y10T 403/7009; Y10T 403/7011;
(Continued)

(56) References Cited

U.S. PATENT DOCUMENTS 378,087 A 2/1888 Field
827,627 A 7/1906 Graham
(Continued)

FOREIGN PATENT DOCUMENTS

| EP | 1619397 A1 * | 1/2006 | ............ F16B 7/0413 |
| EP | 1748196 A1 * | 1/2007 | ............... A45B 9/00 |
| WO | WO-2009039578 A1 * | 4/2009 | ............... B25G 1/04 |

*Primary Examiner* — Josh Skroupa
(74) *Attorney, Agent, or Firm* — Adler Pollock & Sheehan P.C

(57) ABSTRACT

A method and apparatus for a curtain rod bracket and cam lock. A tension rod assembly includes a tension rod, a first curtain rod bracket assembly, the first curtain rod bracket assembly including a first bracket base, a first bracket arm and a first friction pad, the first bracket base including a first bracket base front, a first bracket base rear and defining a first friction pad mounting opening that communicates the first bracket base front with the first bracket base rear, and a second curtain bracket assembly, the second curtain rod bracket assembly including a second bracket base, a second bracket arm and a second friction pad, the second bracket base including a second bracket base front, a second bracket base rear and defining a second friction pad mounting opening that communicates the second bracket base front with the second bracket base rear.

8 Claims, 14 Drawing Sheets

Related U.S. Application Data

(60) Provisional application No. 62/384,895, filed on Sep. 8, 2016, provisional application No. 62/384,744, filed on Sep. 8, 2016.

(58) Field of Classification Search
CPC ......... Y10T 403/7052; Y10T 403/7058; Y10T 403/7067; Y10T 403/7069; Y10T 403/7077; Y10T 403/76
USPC ... 403/109.1, 109.4, 109.5, 109.8, 296, 314, 403/320, 343, 350, 351, 368, 371, 374.3, 403/374.4, 377, 409.1, DIG. 8
See application file for complete search history.

(56) References Cited

U.S. PATENT DOCUMENTS

| | | | |
|---|---|---|---|
| 917,601 A | 4/1909 | Heinrichs | |
| 969,051 A | 8/1910 | Garraway et al. | |
| 1,057,043 A | 3/1913 | Dohm | |
| 1,147,355 A | 7/1915 | Zevin et al. | |
| D60,744 S | 3/1922 | Weyman | |
| D75,598 S | 6/1928 | Priest | |
| D76,096 S | 8/1928 | Vermillion | |
| D76,097 S | 8/1928 | Vebmillion | |
| 2,224,008 A | 12/1940 | Auslander | |
| 2,261,505 A * | 11/1941 | Schlesinger | F16B 7/1436 403/106 |
| 2,298,380 A * | 10/1942 | Hood | F16B 7/14 248/188.5 |
| 2,679,373 A | 5/1954 | Henley | |
| 2,859,879 A | 11/1958 | Rogers et al. | |
| 2,908,471 A | 10/1959 | Hollansworth | |
| 3,506,135 A | 4/1970 | Klingaman | |
| 3,614,045 A | 10/1971 | Cegielski, Jr. | |
| 3,669,395 A | 6/1972 | Gehrke | |
| 3,912,211 A | 10/1975 | Topf | |
| D244,668 S | 6/1977 | Tegner | |
| 4,140,294 A | 2/1979 | Zwarts | |
| 4,162,721 A | 7/1979 | Moriya | |
| D259,241 S | 5/1981 | Lynch et al. | |
| 4,325,528 A | 4/1982 | Martin | |
| D265,285 S | 7/1982 | Englert, Jr. | |
| 4,381,578 A | 5/1983 | Glejf | |
| D279,450 S | 7/1985 | Chap | |
| 4,555,432 A | 11/1985 | Bossons | |
| D281,575 S | 12/1985 | Chap | |
| D285,410 S | 9/1986 | Webber | |
| D290,224 S | 6/1987 | Skinner | |
| D290,931 S | 7/1987 | Powell | |
| 4,684,095 A | 8/1987 | Athey | |
| 4,898,409 A | 2/1990 | Carter | |
| D307,539 S | 5/1990 | Goodman et al. | |
| D315,862 S | 4/1991 | Specker, Jr. | |
| D316,031 S | 4/1991 | Goodman et al. | |
| 5,011,030 A | 4/1991 | Alaurent | |
| 5,069,412 A | 12/1991 | Jacob | |
| D327,642 S | 7/1992 | Foubister | |
| D329,372 S | 9/1992 | Wilms | |
| D346,950 S | 5/1994 | Dunn et al. | |
| 5,351,842 A | 10/1994 | Remmers | |
| 5,549,407 A | 8/1996 | Levi et al. | |
| 5,564,666 A | 10/1996 | Pfeil | |
| 5,582,303 A | 12/1996 | Sloan | |
| D389,035 S | 1/1998 | Smiley et al. | |
| 5,876,147 A * | 3/1999 | Longo | F16B 7/182 16/429 |
| 6,216,889 B1 | 4/2001 | Chang | |
| 6,302,614 B1 * | 10/2001 | Tseng | F16B 7/1463 248/125.8 |
| D455,334 S | 4/2002 | Ivankovic | |
| D459,978 S | 7/2002 | Hollinger | |
| 6,439,520 B1 | 8/2002 | Johnson | |
| D511,088 S | 11/2005 | Chiu | |
| D517,402 S | 3/2006 | Cairns | |
| 7,128,124 B2 | 10/2006 | Bibby et al. | |
| 7,198,088 B2 | 4/2007 | McMenamin et al. | |
| 7,287,734 B2 | 10/2007 | Bell | |
| 7,370,839 B2 | 5/2008 | Putman | |
| D591,143 S | 4/2009 | Ernst et al. | |
| D605,931 S | 12/2009 | Piersant | |
| D605,932 S | 12/2009 | Piersant | |
| D622,578 S | 8/2010 | Kollman | |
| D632,951 S | 2/2011 | McGreevy et al. | |
| 8,056,873 B1 | 11/2011 | Hanley et al. | |
| 8,231,093 B2 | 7/2012 | Tran | |
| D678,754 S | 3/2013 | Burr | |
| 8,418,975 B1 | 4/2013 | Burr | |
| 8,500,078 B2 | 8/2013 | Castellanos | |
| D700,827 S | 3/2014 | Starck | |
| 8,678,068 B1 | 3/2014 | Hobart et al. | |
| D707,535 S | 6/2014 | Burr | |
| 8,740,171 B2 | 6/2014 | Crescenzo | |
| 8,814,114 B2 | 8/2014 | Baines | |
| 8,827,587 B2 * | 9/2014 | Didehvar | A47H 1/022 211/105.3 |
| D714,622 S | 10/2014 | Pan | |
| D715,133 S | 10/2014 | Pan | |
| D715,625 S | 10/2014 | Pan | |
| D715,626 S | 10/2014 | Pan | |
| 8,851,435 B1 | 10/2014 | Bastien et al. | |
| 8,925,747 B1 | 1/2015 | Hanley | |
| 8,960,456 B2 * | 2/2015 | Didehvar | A47K 3/38 211/105.4 |
| D742,726 S | 11/2015 | Glass et al. | |
| D760,068 S | 6/2016 | Sehl | |
| 9,388,837 B1 | 7/2016 | Hanley | |
| D767,378 S | 9/2016 | Sehl | |
| 9,609,974 B2 | 4/2017 | Mateer | |
| 9,687,092 B2 | 6/2017 | Cabanes | |
| D808,779 S | 1/2018 | Shoenhair et al. | |
| 10,047,787 B2 * | 8/2018 | Cheng | A47H 1/022 |
| 10,322,690 B2 * | 6/2019 | Wang | B60R 21/026 |
| 2006/0021722 A1 | 2/2006 | Nien | |
| 2006/0054288 A1 | 3/2006 | Bibby et al. | |
| 2008/0164393 A1 | 7/2008 | Hung | |
| 2008/0210827 A1 | 9/2008 | Samelson | |
| 2009/0032659 A1 | 2/2009 | Goldstein | |
| 2012/0152872 A1 | 6/2012 | Didehvar | |
| 2012/0261371 A1 | 10/2012 | Baines | |
| 2012/0284914 A1 | 11/2012 | Bauer | |
| 2013/0099080 A1 | 4/2013 | Baines | |
| 2013/0292349 A1 | 11/2013 | Bucklew et al. | |
| 2013/0341474 A1 | 12/2013 | Baines | |
| 2014/0166603 A1 | 6/2014 | Baines | |
| 2014/0374367 A1 | 12/2014 | Morel | |
| 2015/0265086 A1 | 9/2015 | Hanley et al. | |
| 2016/0242586 A1 | 8/2016 | Mateer | |
| 2017/0071390 A1 | 3/2017 | Moss et al. | |
| 2017/0079457 A1 | 3/2017 | Baines | |
| 2017/0332818 A1 | 11/2017 | Jones | |
| 2018/0098656 A1 | 4/2018 | Baines | |

* cited by examiner

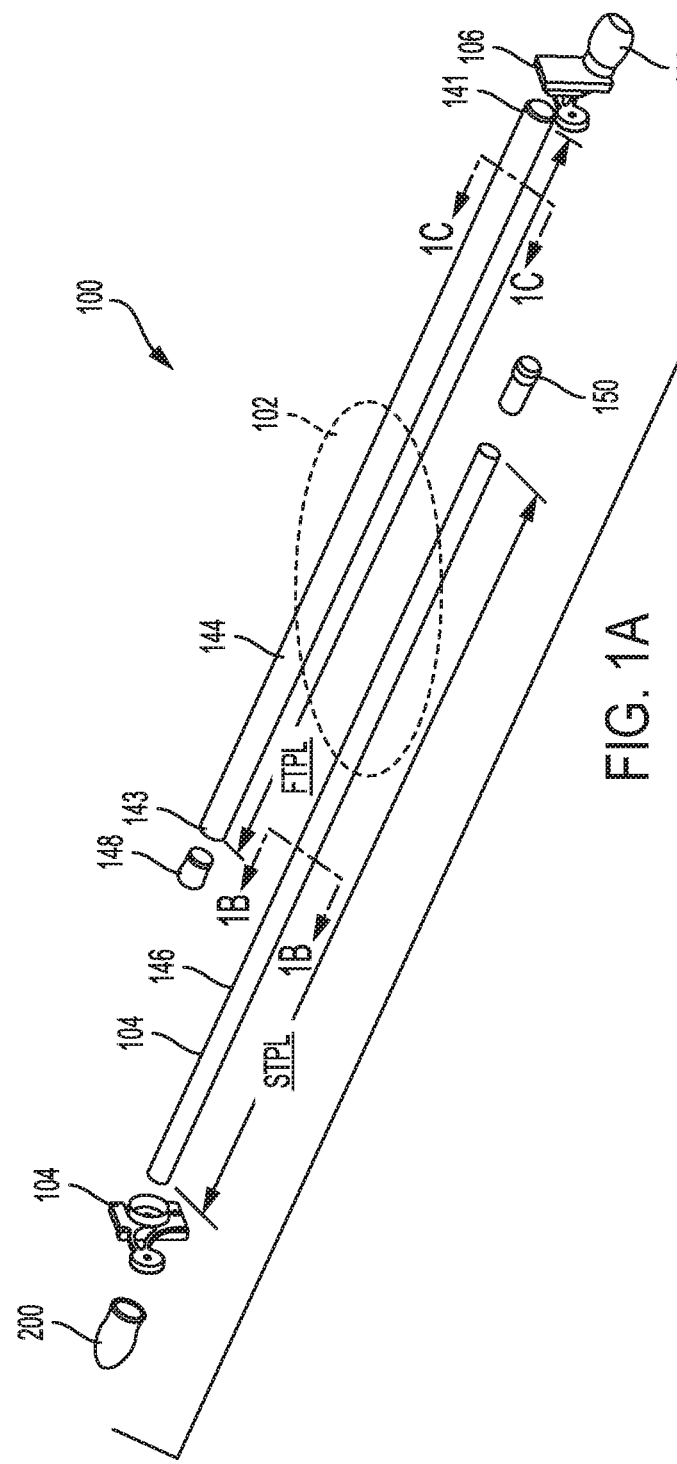
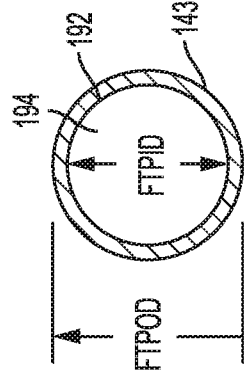
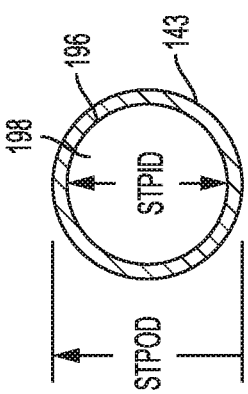

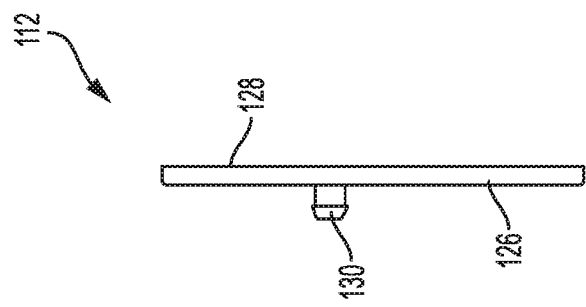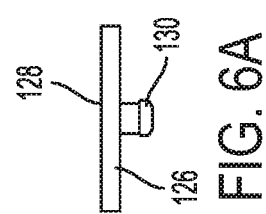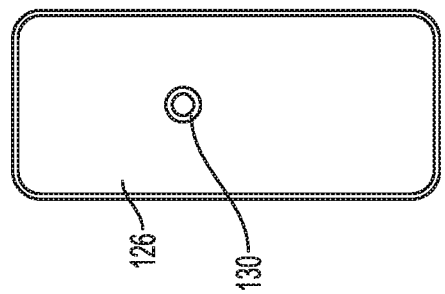

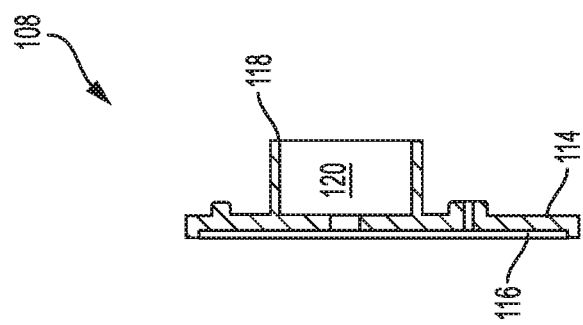
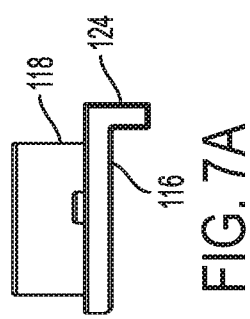
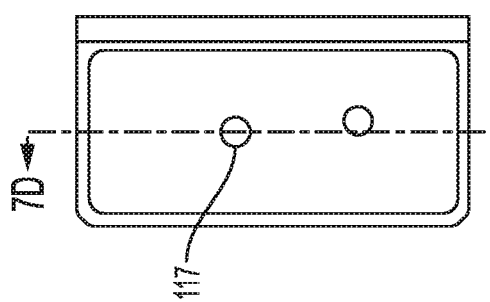
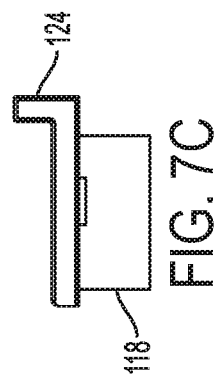

CURTAIN ROD BRACKET AND CAM LOCK

CROSS REFERENCE TO RELATED APPLICATIONS

This application is a Continuation of U.S. patent application Ser. No. 15/668,167, filed Aug. 3, 2017, which claims benefit from U.S. Provisional Patent Application Ser. No. 62/384,895, filed Sep. 8, 2016, and U.S. Provisional Patent Application Ser. No. 62/384,744, filed Sep. 8, 2016. All of these prior applications are incorporated by reference in their entireties.

BACKGROUND OF THE INVENTION

The present invention relates generally to curtain rods, and more particularly to a curtain rod bracket and cam lock.

Curtain rods that require no mounting hardware and that are frictionally held in place are commonly known as tension rods. These rods are desirable to consumers because they require no tools and little or no skill to install. Additionally, installation is usually damage-free to the window casement. However, current designs still have deficiencies that make them somewhat undesirable to certain consumers. For example, if a consumer wishes to decorate the window dressings, these tension rods typically do not allow for the use of a finial or a finial must be installed directly on the window casement. Another deficiency is that installation of current tension rods tends to be clumsy because the installation requires many turns to generate enough tension against the mounting surface to support the rod and curtain system. This typically results in a sloppy installation where the rod ends up being mounted crooked and or the amount of tension is not sufficient to support the rod and curtain system.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides methods and apparatus for a curtain rod bracket and cam lock.

In one aspect, the invention features a tension rod assembly including a tension rod, a first curtain rod bracket assembly, the first curtain rod bracket assembly including a first bracket base, a first bracket arm and a first friction pad, the first bracket base including a first bracket base front, a first bracket base rear and defining a first friction pad mounting opening that communicates the first bracket base front with the first bracket base rear, and a second curtain bracket assembly, the second curtain rod bracket assembly including a second bracket base, a second bracket arm and a second friction pad, the second bracket base including a second bracket base front, a second bracket base rear and defining a second friction pad mounting opening that communicates the second bracket base front with the second bracket base rear.

In another aspect, the invention features a tension rod assembly including a tension rod having a first end and a second end, a first curtain rod bracket assembly, the first curtain rod bracket assembly including a first combined bracket base/arm structure and a first friction pad, and a second curtain rod bracket assembly, the second curtain rod bracket assembly including a second combined bracket base/arm structure and a second friction pad.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The invention will be more fully understood by reference to the detailed description, in conjunction with the following figures, wherein:

FIG. 1A is an exploded side perspective view of an exemplary tension rod assembly.

FIG. 1B is a cross-sectional view of the invention taken along line 1B-1B in FIG. 1A.

FIG. 1C is a cross-sectional view of the invention taken along line 1C-1C in FIG. 1A.

FIG. 6A is a side view of an exemplary friction pad for use with the curtain bracket assembly of FIG. 3.

FIG. 6B is a top view of an exemplary friction pad for use with the curtain bracket assembly of FIG. 3.

FIG. 6C is a side view of an exemplary friction pad for use with the curtain bracket assembly of FIG. 3.

FIG. 7A is a side view of an exemplary bracket base for use with the curtain bracket assembly of FIG. 3.

FIG. 7B is a top view of an exemplary bracket base for use with the curtain bracket assembly of FIG. 3.

FIG. 7C is a side view of an exemplary bracket base for use with the curtain bracket assembly of FIG. 3.

FIG. 7D is a cross-sectional view of an exemplary bracket base for use with the curtain bracket assembly of FIG. 3.

DETAILED DESCRIPTION

Figure 2:
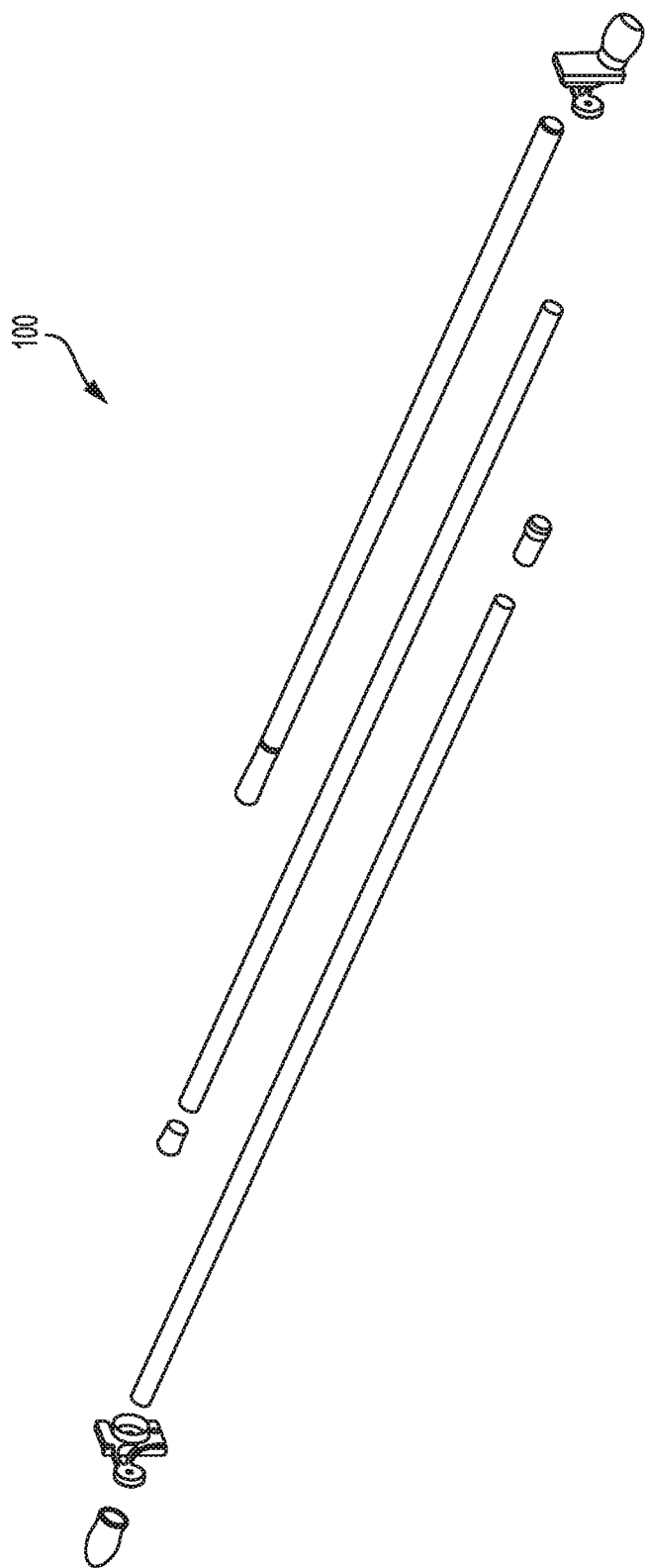
FIG. 2 is an exploded side perspective view of an exemplary tension rod assembly.
Figure 3:
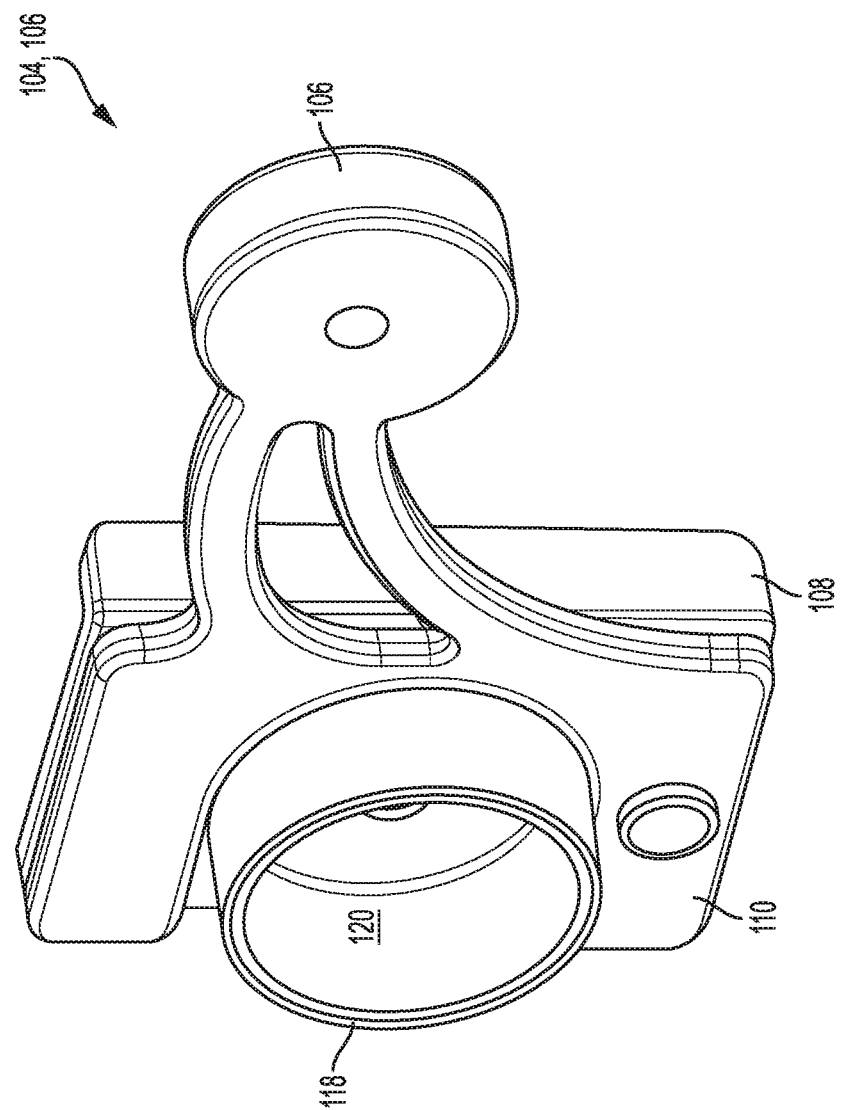
FIG. 3 is a side perspective view of an exemplary curtain bracket assembly for use with the tension rod assembly of FIG. 1A.
Figure 4:
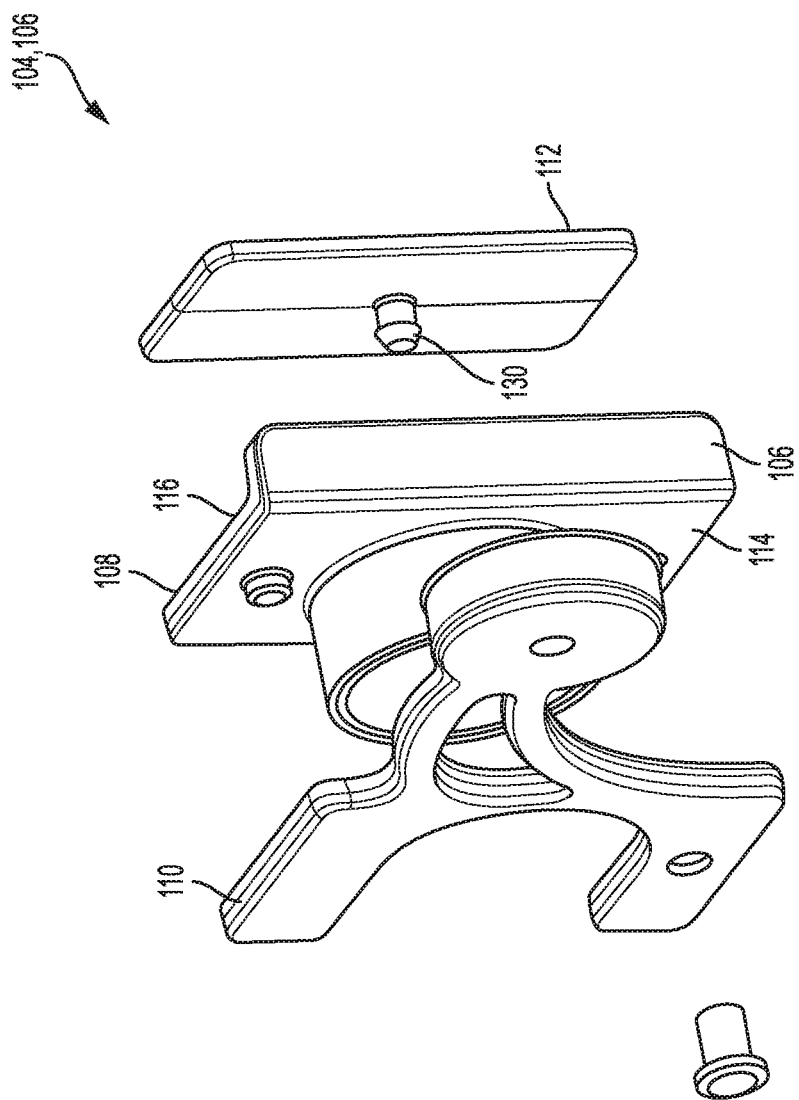
FIG. 4 is an exploded front side perspective view of the curtain bracket assembly of FIG. 3.
Figures 5A, 5B:
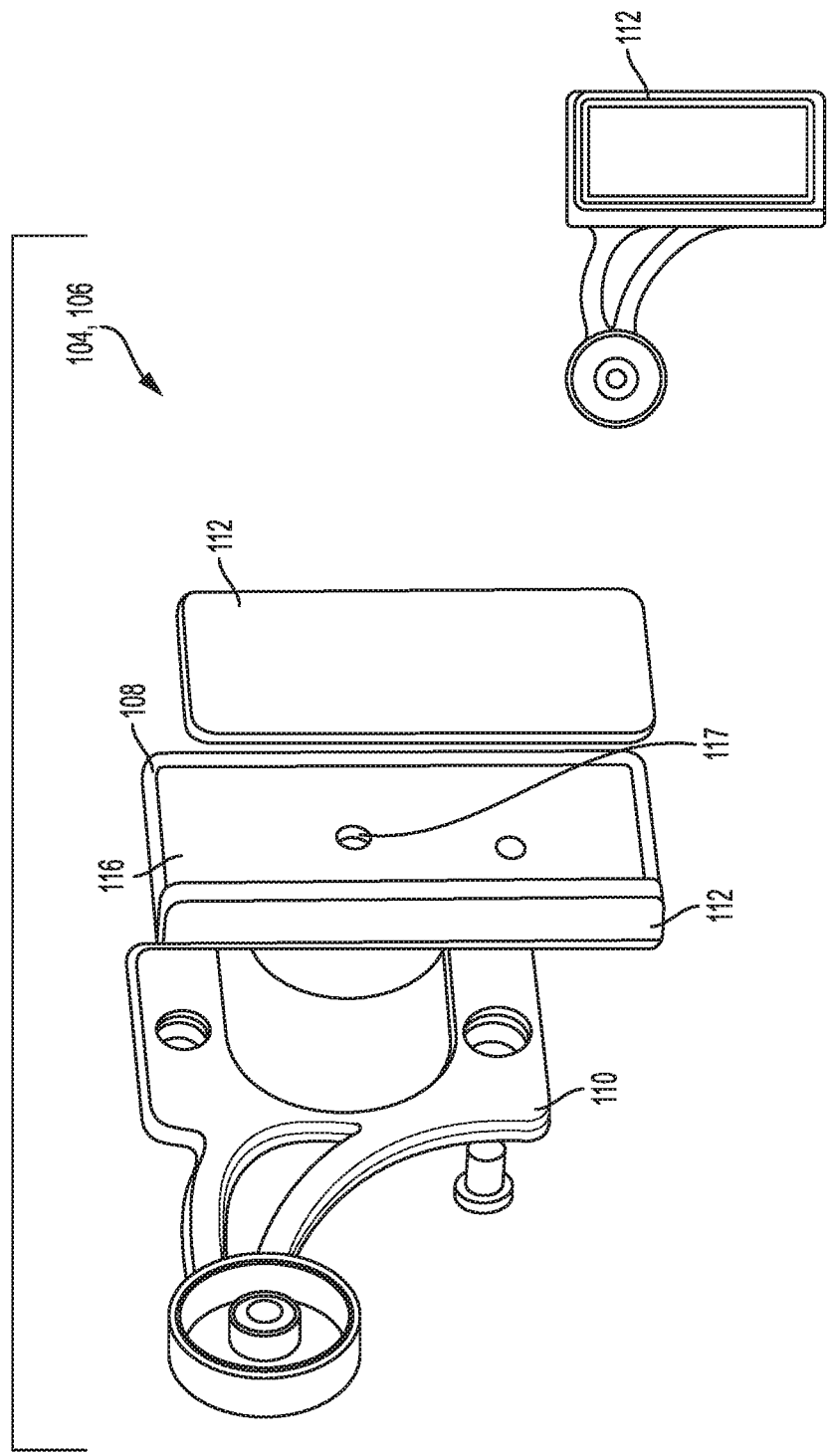
FIG. 5A is an exploded rear side perspective view of the curtain bracket assembly of FIG. 3.
FIG. 5B is a side view of the curtain bracket assembly of FIG. 3.
Figure 8C:
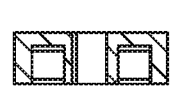
FIG. 8C is a cross-sectional view of an exemplary bracket arm finial support for use with the curtain bracket assembly of FIG. 3.
Figure 8B:
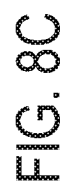
FIG. 8B is a cross-sectional view of an exemplary bracket arm finial support for use with the curtain bracket assembly of FIG. 3.
Figure 8A:
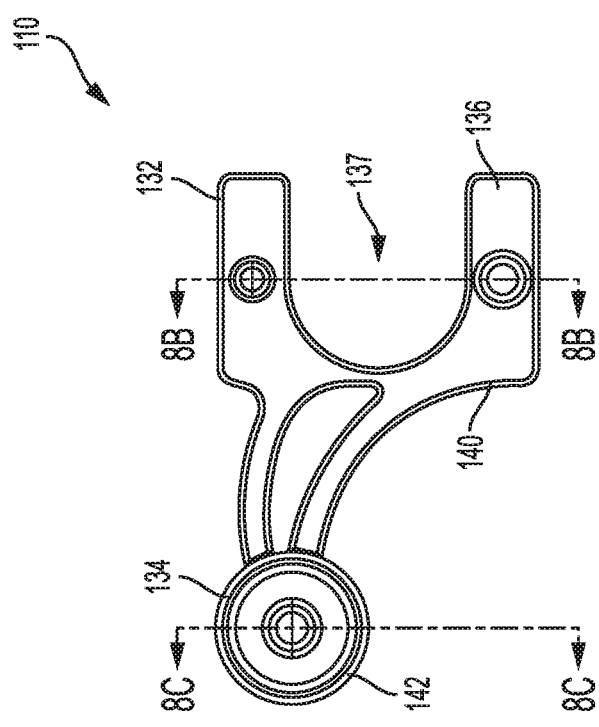
FIG. 8A is a side view of an exemplary bracket arm finial support for use with the curtain bracket assembly of FIG. 3.
Figure 8D:
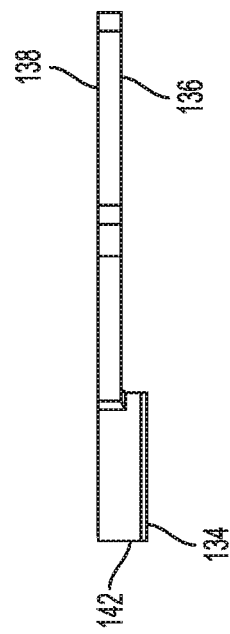
FIG. 8D is a top view of an exemplary bracket arm finial support for use with the curtain bracket assembly of FIG. 3.
Figure 9:
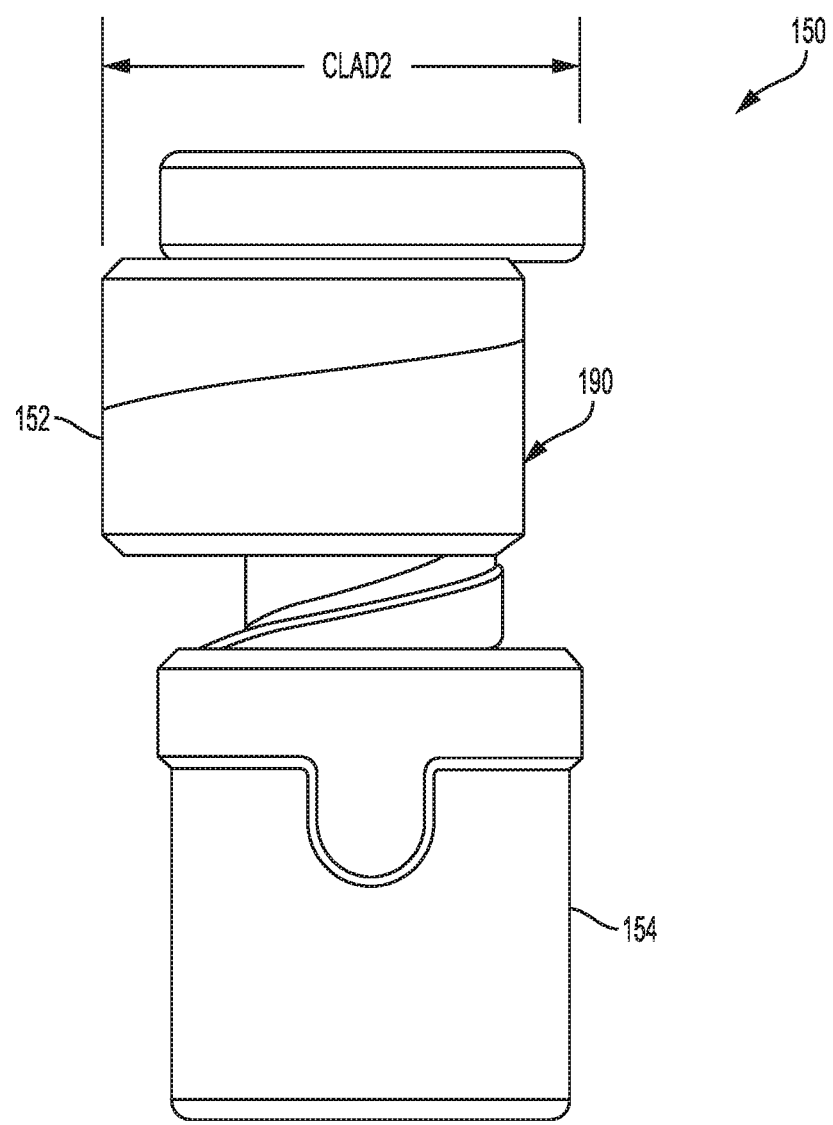
FIG. 9 is a side perspective view of a cam lock assembly for use with the tension rod assembly of FIG. 1.
Figure 10B:
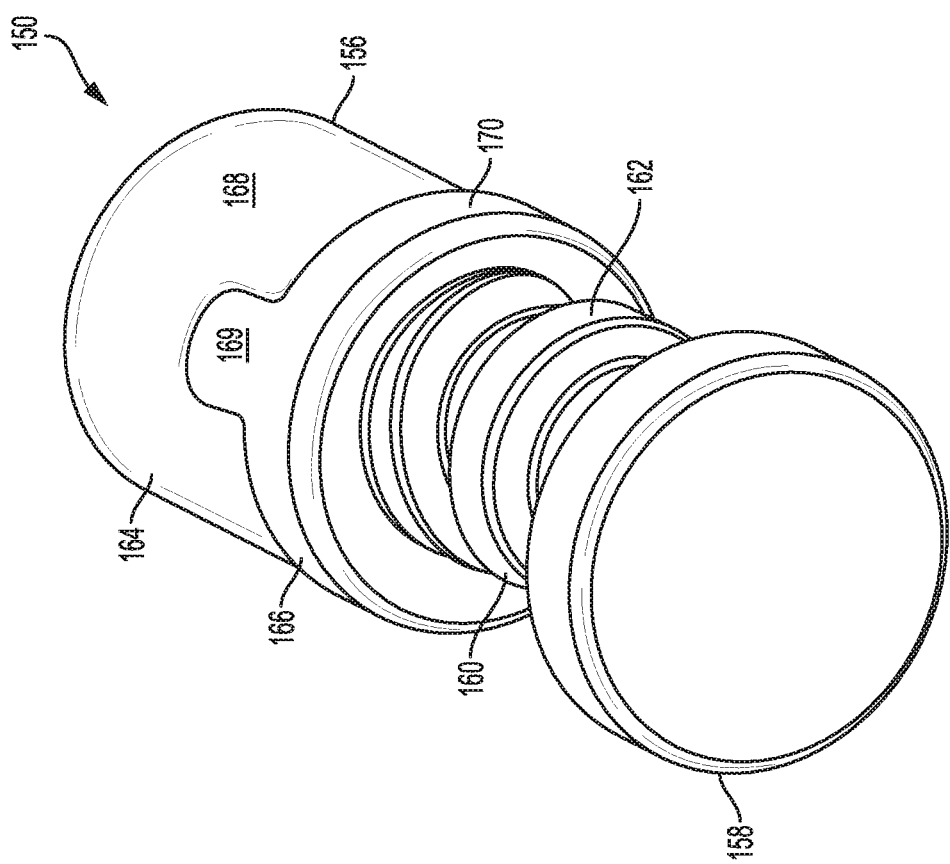
FIG. 10B is a side perspective view of an exemplary disassembled cam lock assembly for use with the tension rod assembly of FIG. 9.
Figure 10A:
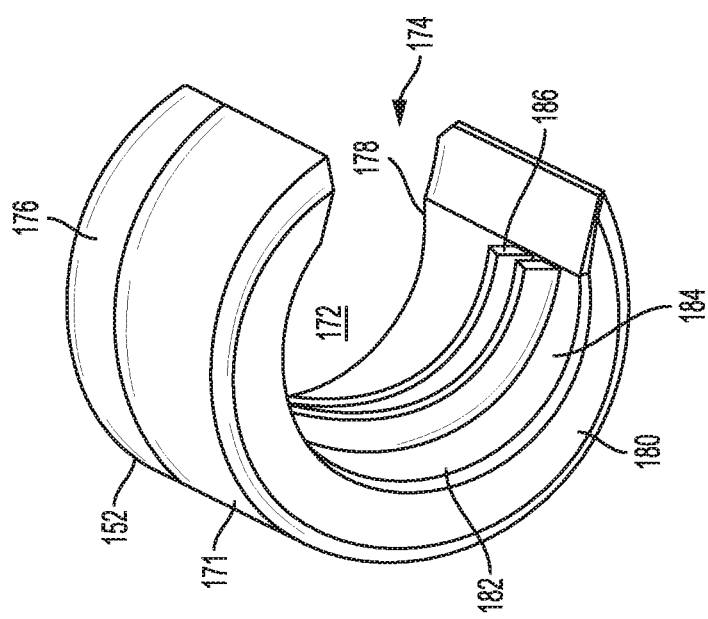
FIG. 10A is a side perspective view of an exemplary disassembled cam lock assembly for use with the tension rod assembly of FIG. 9.
Figure 11B:
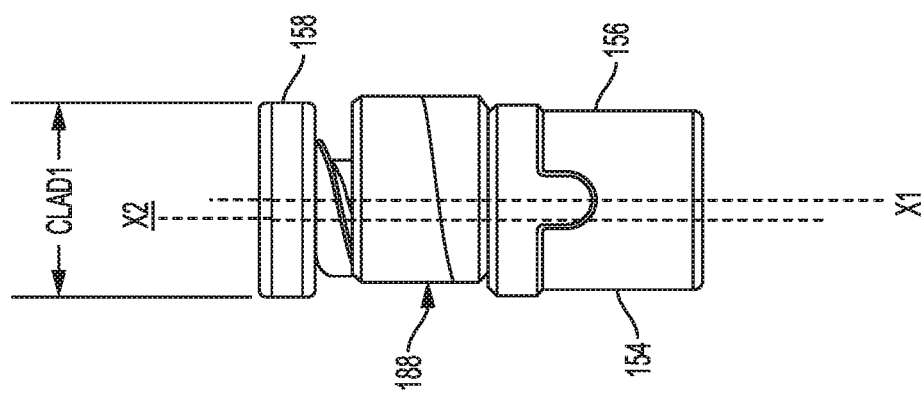
FIG. 11B is a side perspective view of an exemplary unassembled camlock assembly for use with the tension rod assembly of FIG. 9.
Figure 11A:
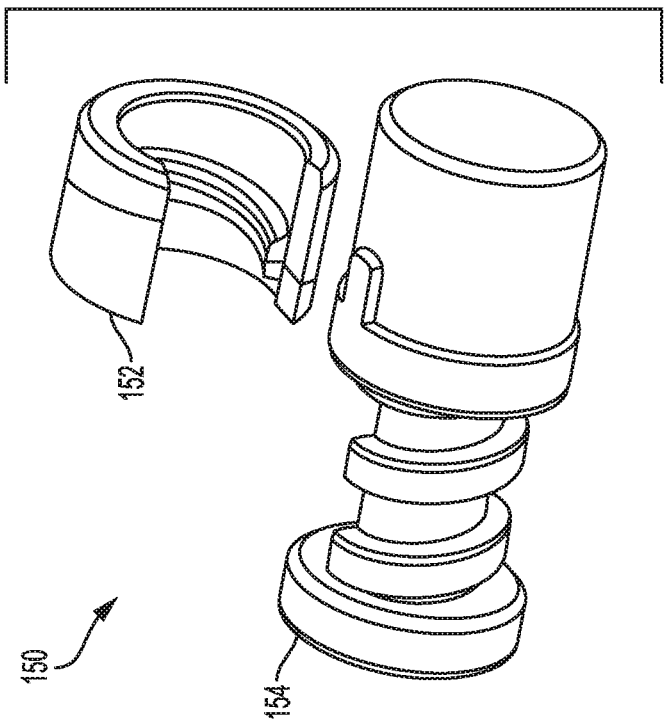
FIG. 11A is an exploded side perspective view of an exemplary unassembled cam lock assembly for use with the tension rod assembly of FIG. 9.
Figure 12B:
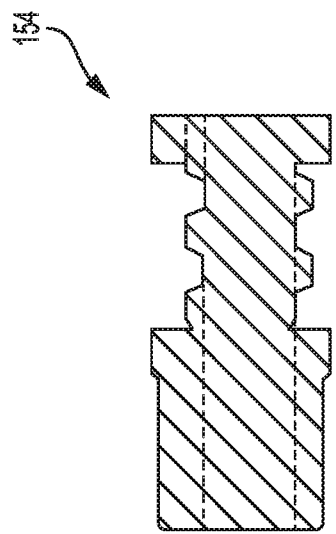
FIG. 12B is a side perspective view of an exemplary lead screw for use with the cam lock assembly of FIG. 9.
Figure 12C:
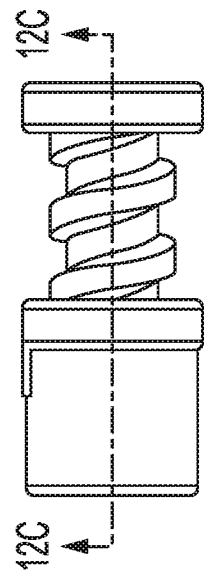
FIG. 12C is a cross-sectional perspective view of an exemplary lead screw for use with the cam lock assembly of FIG. 9.
Figure 12D:
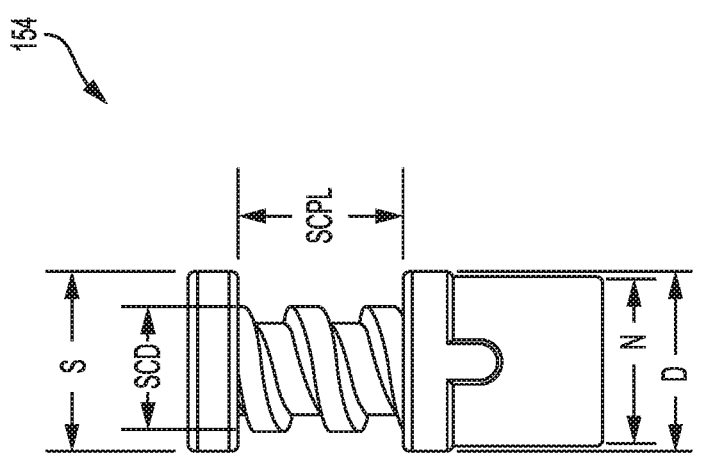
FIG. 12D is a side perspective view of an exemplary lead screw for use with the cam lock assembly of FIG. 9.
Figure 12A:
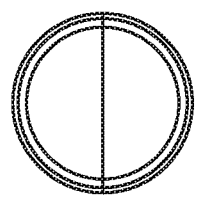
FIG. 12A is a top view of an exemplary lead screw for use with the cam lock assembly of FIG. 9.
Figure 13C:
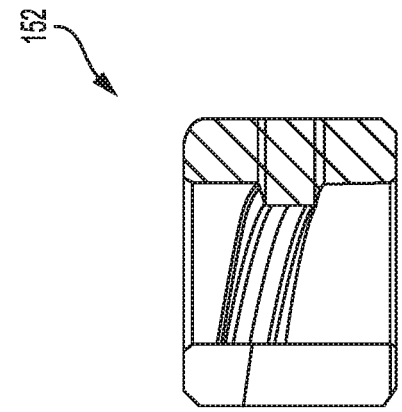
FIG. 13C is a cross-sectional view of an exemplary bushing for use with the cam lock assembly of FIG. 9.
Figure 13A:
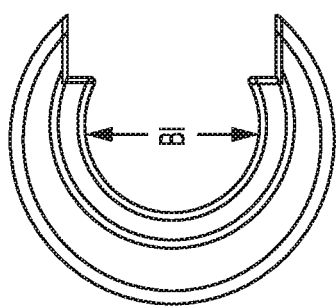
FIG. 13A is a top view of an exemplary bushing for use with the cam lock assembly of FIG. 9.
Figure 13B:
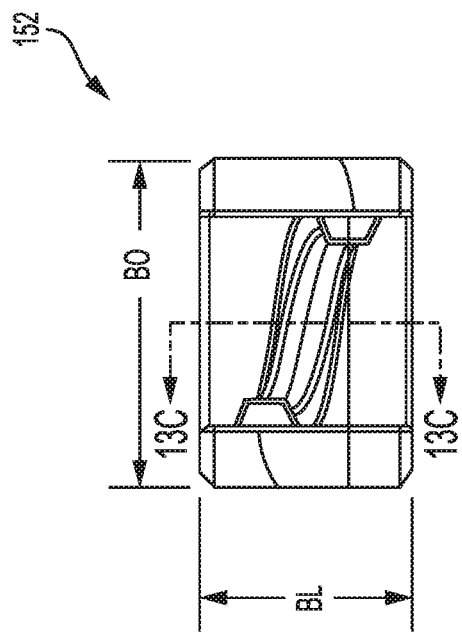
FIG. 13B is a side view of an exemplary bushing for use with the cam lock assembly of FIG. 9.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

In addition, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

The present invention provides a curtain rod bracket and cam lock.

Referring now to the figures, a tension rod assembly 100 having a tension rod 102, a first curtain rod bracket assembly 104 and a second curtain bracket assembly 106 is shown, in accordance with one embodiment of the invention. The first and second curtain rod bracket assemblies 104, 106 each include a bracket base 108, a bracket arm 110 and a friction pad 112, wherein the bracket base 108 includes a bracket base front 114, a bracket base rear 116 and defines a friction pad mounting opening 117, which communicates the bracket base front 114 with the bracket base rear 116. The bracket base 108 further includes a rod support structure 118 which extends out of the bracket base front 114 and which defines a rod cavity 120 having a rod cavity opening 122, wherein the rod cavity opening 122 is communicated with the rod cavity 120. It should be appreciated that the rod cavity 120 is sized and shaped to receive and contain one end of the tension rod 102. It should be appreciated that in one embodiment the rod support structure 118 is substantially round in shape such that the rod cavity 120 is substantially cylindrical.

The bracket base 108 also includes a bracket base lip 124 which extends out of and is substantially perpendicular to the bracket base rear 116, wherein the bracket base lip 124 is located to one side of the bracket base rear 116. It should be appreciated that this bracket base lip 124 advantageously forms a right angle with the bracket base rear 116 to align with the corner of the window casement when mounted. This also helps to keep the bracket base 108 stable and aligned when it is associated with the window casement. Furthermore, it is contemplated that in other embodiments, the bracket base 108 may not include a bracket base lip 124 and the bracket base rear 116 is substantially flat. The friction pad 112 includes a friction pad front 126 and a friction pad rear 128, wherein the friction pad front 126 includes a friction pad mounting stud 130 which extends out of and is substantially perpendicular to the friction pad front 126. It should be appreciated that the friction pad rear 128 includes a rough surface to prevent the friction pad 112 and thus the bracket base 108 from moving.

The bracket arm 110 includes a bracket arm mounting portion 132 and a bracket arm finial support 134, wherein the bracket arm mounting portion 132 includes a bracket arm mounting portion front 136, a bracket arm mounting portion rear 138 and a bracket arm mounting portion side 140, wherein the bracket arm mounting portion 132 is configured to be securely associated with the bracket base front 114. The bracket arm mounting portion 132 defines a bracket arm cavity 137 which communicates the bracket arm mounting portion front 136 with the bracket arm mounting portion rear 138 and which is at least partially arcuate in shape. The bracket arm cavity 137 is configured to contain the rod support structure 118 when the bracket arm mounting portion 132 is associated with the bracket base front 114. The bracket arm finial support 134 extends out of the bracket arm mounting portion side 140 and includes a final mounting structure 142, wherein the finial mounting structure 142 is configured to securingly engage with a finial.

For each of the first curtain rod bracket assembly 104 and second curtain bracket assembly 106 the friction pad 112 is securely mounted to the bracket base 108 by associating the friction pad front 126 with the bracket base rear 116 such that the friction pad mounting stud 130 is located within the friction pad mounting opening 117, wherein the friction pad mounting opening 117 and the friction pad mounting stud 117 are sized and configured to securely engage with each other. The bracket arm 110 is associated with the bracket base 108 such that the bracket arm mounting portion rear 138 is securely in contact with the bracket base front 114 and the rod support structure is located within the bracket arm rod cavity 136. It should be appreciated that the bracket arm 110 may be associated with the bracket base 108 via any method and/or article suitable to the desired end purpose, such as thumb screws (as in the present embodiment), clips snaps, adhesive, etc.

The tension rod 102 includes a first tube portion 144 and a second tube portion 146, wherein the first tube portion 144 and the second tube portion 146 are movably associated with each other via a ferrule 148 and a cam lock assembly 150. As discussed hereinafter, the cam lock assembly 150 is configurable to cause the first tube portion 144 and second tube portion 146 to lockingly interact with each other such that the tension rod 102 is configurable between a first length and a second length, wherein the second length is greater than the first length.

The cam lock assembly 150 is shown and includes a bushing 152 and a lead screw 154, wherein the cam lock assembly 150 includes a first cam lock assembly diameter CLAD1 and a second cam lock assembly diameter CLAD2, wherein CLAD1 is smaller than CLAD2. The lead screw 154 includes lead screw base 156 and a lead screw shoulder 158 separated by a screw center portion 160 having a screw center portion length SCPL, wherein the screw center portion 160 includes a screw thread 162 which extends along the outer surface of the screw center portion 160 between the lead screw base 156 and the lead screw shoulder 158 (i.e. the screw center portion length SCPL). It should be appreciated that in one embodiment, the screw thread 162 include a pitch of about. 0.375 inches. Additionally, the lead screw base 156 includes a lead screw base body 164 and a lead screw base neck 166, wherein the lead screw base body 164 includes a body outer surface 168 and the lead screw base neck 166 includes a neck outer surface 170. It should be appreciated that the body outer surface 168 includes a body diameter D and the neck outer surface 170 includes a neck diameter N, wherein the body diameter D is smaller than the neck diameter N. Furthermore, the lead screw shoulder 158 includes a shoulder diameter S, wherein the shoulder diameter S is about the same as the neck diameter N. Additionally, the lead screw base neck 166 includes a neck keyed portion 169 which extends downward from the lead screw base neck 166 toward the lead screw base body 164.

It should be appreciated that the screw center portion 160 includes a screw center portion diameter SCD, wherein the screw center portion diameter SCD is smaller than the neck diameter N and the shoulder diameter S. It should be further appreciated that the screw center portion 160 is positioned to be offset from the lead screw base 156 and the lead screw shoulder 158 which are aligned with each other. That is, the lead screw base 156 and the lead screw shoulder 158 define a first axis X1 and the screw center portion 160 defines a second axis X2, wherein X1 and X2 are offset from each other.

The bushing 152 is substantially "C" shaped and includes a bushing length BL and a bushing outer surface 171. The bushing 152 defines a bushing inner cavity 172 and a bushing side opening 174, wherein the bushing side opening 174 is communicated with the bushing inner cavity 172. The bushing 152 includes a bushing first end 176 having a bushing first end opening 178 and a bushing second end 180 having a bushing second end opening 182, wherein the bushing first end 176 and the bushing second end 180 are communicated with the bushing inner cavity 172. The bushing inner cavity 172 includes a bushing inner cavity surface 184 having a bushing thread 186, wherein the bushing thread 186 includes a pitch of about 0.251 inches. It should be appreciated that the bushing inner cavity 172, the bushing side opening 174, the bushing first end opening 178 and the bushing second end opening 182 are sized and shaped such that the screw center portion 160 can pass through the bushing side opening 174 and be contained within the bushing inner cavity 172. It should be appreciated that the bushing 152 includes a bushing outer diameter BO and a bushing inner diameter BI, wherein the bushing inner diameter BI is sized to contain the screw center portion 160 such that the bushing thread 186 and the screw thread 162 engage. Furthermore, it should be appreciated that the bushing length BL is less than the screw center portion length SCPL.

As such, when the screw center portion 160 is located within the bushing inner cavity 172, the bushing 152 is configurable between a first configuration 188 and a second configuration 190. When the bushing is in the first configuration 188, the cam lock assembly 150 has the first cam lock assembly diameter CLAD1 and when the bushing is in the second configuration 190, the cam lock assembly 150 has the second cam lock assembly diameter CLAD2, wherein the second cam lock assembly diameter CLAD2 is larger than the first cam lock assembly diameter CLAD1. It should be appreciated that cam lock assembly diameter can configured between CLAD1 and CLAD2 by rotating the bushing 152 while the screw center portion 160 is located within the bushing inner cavity 172. This causes the bushing 152 to traverse along the screw center portion length SCPL between the first configuration 188 and the second configuration 190. It should be appreciated that the asymmetry between the bushing 152 and the lead screw 154 (i.e. the offset positioning of the screw center portion 160 and the different pitch between the bushing thread 186 and the screw thread 162) causes the bushing 152 to extend laterally away from the screw thread.

Referring again to the Figures, the first tube portion 144 includes a first tube portion wall end 141, a first tube portion interface end 143 and a first tube portion length FTPL and defines a first tube portion opening 192 on the first tube portion interface end 143 and a first tube portion cavity 194 which extends at least a portion of the first tube portion length FTPL, wherein the first tube portion opening 192 is communicated with the first tube portion cavity 194. Additionally, the second tube portion 146 includes a second tube portion wall end 145, a second tube portion interface end 147 and a second tube portion length STPL and defines a second tube portion opening 196 on the second tube portion interface end 147 and a second tube portion cavity 198 which extends at least a portion of the second tube portion length STPL, wherein the second tube portion opening 196 is communicated with the second tube portion cavity 198. Furthermore it should be appreciated that the first tube portion 144 includes a first tube portion inner diameter FTPID and a first tube portion outer diameter FTPOD and the second tube portion 146 includes a second tube portion inner diameter STPID and a second tube portion outer diameter STPOD, wherein the first tube portion inner diameter FTPID is larger than the second tube portion outer diameter STPOD.

It should be appreciated that the tension rod assembly 100 is assembled as follows. The tension rod 102 is assembled by associating the cam lock assembly 150 with the second tube portion 146. This may be accomplished by inserting the lead screw base 156 into the second tube portion opening 196 such that the lead screw base neck 166 is contacting the second tube portion 146. It should be appreciated that the second tube portion 146 includes a second tube keyed portion which is configured to frictionally and securely engage with the neck keyed portion of the lead screw base neck 166. This keeps the cam lock assembly 150 securely associated with the second tube portion 146 by securely associating the lead screw base 156 within the second tube portion cavity 198. As such, the screw center portion 160 and the lead screw shoulder 158 are protruding from the second tube portion opening 196. The ferrule 148 is then associated with the first tube portion 144 by locating the ferrule 148 within the first tube portion cavity 194 such that a portion of the ferrule 148 is protruding from the first tube portion opening 192.

The bushing 152 is then associated with cam lock assembly 150 by locating the screw center portion 160 within the bushing inner cavity 172 such that the bushing 152 is in the first configuration. The second tube portion 146 is then associated with the first tube portion 144 by inserting the second tube portion 146 within the first tube portion cavity 194 such that the cam lock assembly 150 is located within the first tube portion cavity 194. It should be appreciated that when the cam lock assembly 150 is located within the first tube portion cavity 194 the bushing outer surface 171 is in contact with the inner wall of the first tube portion 144. Since the busing is in the first configuration 188, the second tube portion 146 can move freely within the first tube portion cavity 194. The first curtain rod bracket assembly 104 and the second curtain bracket assembly 106 are then associated with a window casement such that the friction pad 112 of each of the first curtain rod bracket assembly 104 and the second curtain bracket assembly 106 are contacting the opposing walls of the window casement.

The first tube portion 144 and the second tube portion 146 are then pulled away from each other such that the first tube portion wall end 141 is located within the rod cavity 120 of the first curtain rod bracket assembly 104 and the second tube portion wall end 145 is located within the rod cavity 120 of the second curtain rod bracket assembly 106. In this configuration, the first tube portion wall end 141 is pushing against one wall of the wall casement and the second tube portion wall end 145 is pushing against the opposing wall of the wall casement. The first tube portion 144 and the second tube portion 146 are then rotated in opposite direction relative to each other. This causes the bushing 152, which is in contact with the inner wall of the first tube portion 144, to rotate relative to the lead screw 154, which is held in place by the keyed portion. As such, the bushing 152 is configured from the first configuration 188 into the second configuration 190, thereby causing the bushing 152 and the lead screw 154 to press against the inner wall of the first tube portion 144 locking the first tube portion 144 and the second tube portion 146 in place. A finial 200 may then be connected to the bracket arm finial support 134 via a screw, clip, adhesive and/or any other method and/or article for attachment suitable to the desired end purpose.

Figure 14B:
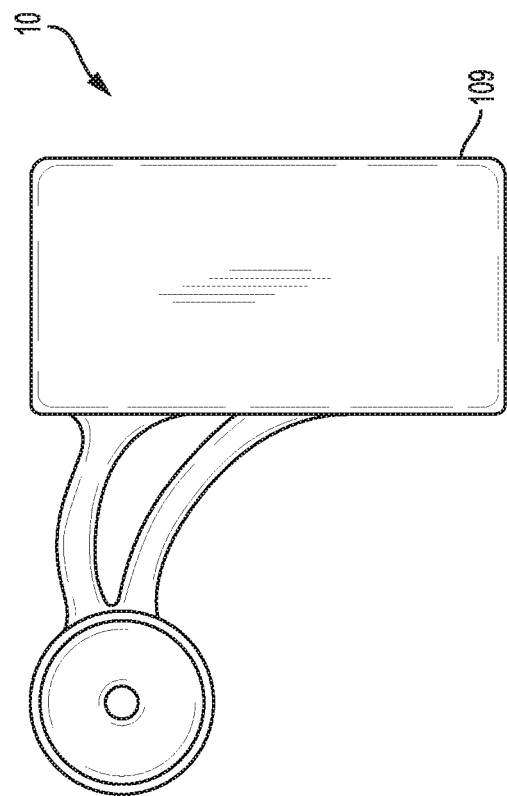
FIG. 14B is a side view of an alternate curtain bracket assembly of FIG. 3.
Figure 14A:
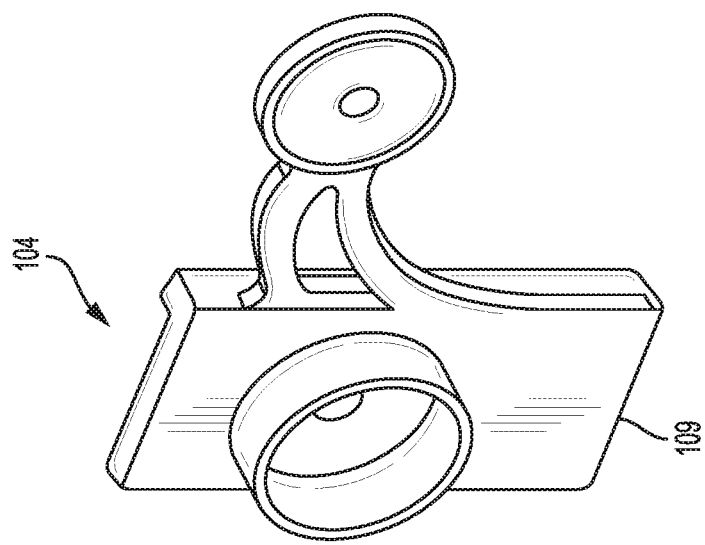
FIG. 14A is a perspective view of an alternate curtain bracket assembly of FIG. 3.

Referring now to FIG. 14, in an alternate embodiment, each of the first curtain rod bracket assembly 104 and a second curtain bracket assembly 106 is constructed as a one piece design rather than with a separate bracket base 108 and bracket arm 110. Rather, the first curtain rod bracket assembly 104 and a second curtain bracket assembly 106 include a single structure 109 that combines the functions of the bracket base 108 and bracket arm 110.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A lead screw configured for a cam lock assembly, the lead screw comprising:
    a lead screw base;
    a lead screw shoulder, the lead screw base and the lead screw shoulder separated by a screw center portion having a screw center portion length, the screw center portion including a screw thread that extends along an outer surface of the screw center portion between the lead screw base and the lead screw shoulder;
    wherein the screw thread includes a pitch of about 0.375 inches;
    wherein the lead screw base includes a lead screw base body and a lead screw base neck;
    wherein the lead screw base body includes a body outer surface and the lead screw base neck (166) includes a neck outer surface;
    wherein the body outer surface includes a body diameter (D) and the neck outer surface includes a neck diameter (N), wherein the body diameter (D) is smaller than the neck diameter (N);
    wherein the lead screw shoulder includes a shoulder diameter (S), the shoulder diameter (S) about the same as the neck diameter (N);
    wherein the lead screw base neck includes a neck keyed portion that extends downward from the lead screw base neck toward the lead screw base body;
    wherein the screw center portion includes a screw center portion diameter (SCD), the screw center portion diameter (SCD) smaller than the neck diameter (N) and the shoulder diameter (S); and
    wherein the screw center portion is positioned to be offset from the lead screw base and the lead screw shoulder which are aligned with each other.

2. A lead screw configured for a cam lock assembly, the lead screw comprising:
    a lead screw base;
    a lead screw shoulder, the lead screw base and the lead screw shoulder separated by a screw center portion having a screw center portion length, the screw center portion including a screw thread that extends along an outer surface of the screw center portion between the lead screw base and the lead screw shoulder;
    wherein the screw thread includes a pitch of about 0.375 inches;
    wherein the lead screw base includes a lead screw base body and a lead screw base neck;
    wherein the lead screw base body includes a body outer surface and the lead screw base neck (166) includes a neck outer surface;
    wherein the body outer surface includes a body diameter (D) and the neck outer surface includes a neck diameter (N), wherein the body diameter (D) is smaller than the neck diameter (N);
    wherein the lead screw shoulder includes a shoulder diameter (S), the shoulder diameter (S) about the same as the neck diameter (N);
    wherein the lead screw base neck includes a neck keyed portion that extends downward from the lead screw base neck toward the lead screw base body;
    wherein the screw center portion includes a screw center portion diameter (SCD), the screw center portion diameter (SCD) smaller than the neck diameter (N) and the shoulder diameter (S); and
    wherein the lead screw base and the lead screw shoulder define a first axis (X1) and the screw center portion defines a second axis (X2), wherein (X1) and (X2) are offset from each other.

3. A lead screw configured for a cam lock assembly, the lead screw comprising:
    a lead screw base;
    a lead screw shoulder, the lead screw base and the lead screw shoulder separated by a screw center portion having a screw center portion length, the screw center portion including a screw thread that extends along an outer surface of the screw center portion between the lead screw base and the lead screw shoulder;

wherein the screw thread includes a pitch of about 0.375 inches;

wherein the lead screw base includes a lead screw base body and a lead screw base neck;

wherein the lead screw base body includes a body outer surface and the lead screw base neck (166) includes a neck outer surface;

wherein the body outer surface includes a body diameter (D) and the neck outer surface includes a neck diameter (N), wherein the body diameter (D) is smaller than the neck diameter (N);

wherein the lead screw shoulder includes a shoulder diameter (S), the shoulder diameter (S) about the same as the neck diameter (N);

wherein the lead screw base neck includes a neck keyed portion that extends downward from the lead screw base neck toward the lead screw base body; and wherein the cam lock assembly includes a bushing, the bushing substantially "C" shaped and including a bushing length (BL) and a bushing outer surface.

4. The lead screw of claim 3 wherein the bushing defines a bushing inner cavity and a bushing side opening, the bushing side opening communicated with the bushing inner cavity.

5. The lead screw of claim 4 wherein the bushing comprises:

a bushing first end having a bushing first end opening; and a bushing second end having a bushing second end opening, the bushing first end and the bushing second end communicated with the bushing inner cavity, the bushing inner cavity including a bushing inner cavity surface having a bushing thread, the bushing thread including a pitch of about 0.251 inches.

6. The lead screw of claim 5 wherein the bushing inner cavity, the bushing side opening, the bushing first end opening and the bushing second end opening are sized and shaped such that the screw center portion can pass through the bushing side opening and be contained within the bushing inner cavity.

7. The lead screw of claim 6 wherein the screw center portion is located within the bushing inner cavity, the bushing is configurable between a first configuration and a second configuration.

8. The lead screw of claim 7 wherein an offset positioning of the screw center portion and the different pitch between the bushing thread and the screw thread causes the bushing to extend laterally away from the screw thread.

* * * * *